United States Patent [19]

Hudson et al.

[11] Patent Number: 5,377,798
[45] Date of Patent: Jan. 3, 1995

[54] CLUTCH PLATE WITH BLOCKING WALL FOR A VISCOUS FLUID CLUTCH

[75] Inventors: B. Drennen, Bellbrook; Lawrence C. Kennedy, Kettering Ohio

[73] Assignee: General Motors Corporation, Detroit, Mich.

[21] Appl. No.: 116,841

[22] Filed: Sep. 7, 1993

[51] Int. Cl.6 .............................................. F16D 35/00
[52] U.S. Cl. .................................. 192/58 B; 192/82 T
[58] Field of Search ........................... 192/588, 82 T

[56] References Cited

U.S. PATENT DOCUMENTS

| 3,983,981 | 10/1976 | Snodgrass et al. | 192/58 B |
| 4,235,322 | 11/1980 | Sutaruk | 192/58 B |
| 4,238,015 | 12/1980 | Schmida | 192/58 B |
| 4,295,550 | 10/1981 | Hayashi | 192/58 B |
| 4,313,531 | 2/1982 | Hori et al. | 192/58 B |
| 4,328,881 | 5/1982 | Rohrer | 192/58 B |
| 4,414,925 | 11/1983 | Mellin | 123/41.12 |
| 4,606,445 | 8/1986 | Rockey | 192/58 B |
| 4,630,721 | 12/1986 | Johnston et al. | 192/58 B |
| 4,633,988 | 1/1987 | Light | 192/58 B |
| 4,924,985 | 5/1990 | Kennedy | 192/58 B |
| 4,924,987 | 5/1990 | Kennedy | 192/58 B |
| 4,938,328 | 7/1990 | Kennedy | 192/58 B |
| 4,938,329 | 7/1990 | Kennedy | 192/58 B |
| 5,070,980 | 12/1991 | Nakagawa | 192/58 B |

Primary Examiner—Andrea L. Pitts
Attorney, Agent, or Firm—A. Michael Tucker; Anthony L. Simon

[57] ABSTRACT

A fan clutch includes a housing and a cover cooperating to contain a viscous fluid. A pump plate divides an interior of the fan clutch into a working chamber and a reservoir. A driven clutch plate, disposed in the working chamber, includes hub and disk portions. A wiper is mounted on the pump plate adjacent a discharge orifice so that a first clearance is provided between the wiper and a front surface of the disk portion. An annular blocking wall is formed on the front surface of the disk portion radially inbound of the wiper. The height of the blocking wall is such that a second clearance formed between the blocking wall and the pump plate is less than or substantially equal to the first clearance, thereby forming a dynamic seal.

5 Claims, 2 Drawing Sheets

CLUTCH PLATE WITH BLOCKING WALL FOR A VISCOUS FLUID CLUTCH

BACKGROUND OF THE INVENTION

1. Field of the Invention

The present invention relates generally to a viscous fluid drive device. In particular, the present invention is concerned with an improved clutch plate of a viscous fluid fan clutch for a vehicle.

2. Description of the Related Art

The use of a viscous fluid clutch for controlling the rotation of an engine cooling fan for a vehicle is very well-known. A multi-bladed fan is removably secured to a fan clutch installed between an accessory pulley (typically the water pump pulley) of a vehicle engine and a radiator. The clutch drives the fan at high speeds close to input speed when cooling is required and permits the fan to rotate at low speeds when cooling is not required. Thermostatic control of the fan through the clutch reduces airflow noise caused by fan rotation and the load on an engine, resulting in horsepower gain and improved fuel economy.

Generally, a clutch plate, housed within the clutch assembly, having lands and grooves is mated to a housing having complementary lands and grooves. An internally-contained pump plate separates a working chamber from a reservoir. Gates in the pump plate permit selective flow of a viscous fluid from the reservoir to the working chamber and into a shear zone between the lands and grooves of the housing and clutch plate. Fluid shear in the lands and grooves transfers input torque from the clutch plate to drive the housing and attached fan.

When cooling is not required, gates in the pump plate are closed and the fluid in the shear zone is pumped into the receiving chamber. Orifices in the pump plate permit passage of the fluid from the working chamber to the reservoir. The removal of a majority of the fluid reduces the shear between the clutch plate and the housing, thereby substantially reducing the rotation of the housing and attached fan.

U.S. Pat. No. 4,741,421, issued May 3, 1988 and assigned to the assignee of the present invention, discloses a sealing ring operatively disposed between facing surfaces of a clutch plate and pump plate in a viscous fluid fan clutch. The sealing ring positively diverts fluid flow into axial flow passages formed in the clutch plate, thereby ensuring that all viscous fluid is subjected to shear by the interdigitated lands, which form a shear zone. The sealing ring improves fluid fill and clutch drive time.

It is desirable to produce a fan clutch wherein a sealing ring is not required to control fluid flow.

SUMMARY OF THE INVENTION

The present invention includes a viscous fluid fan clutch having an improved clutch plate. An annular blocking wall is formed on a surface of the clutch plate facing a pump plate. The wall is of sufficient height that a reduced clearance between the wall and pump plate forms a dynamic seal which does not permit substantial fluid flow past the wall, thereby improving clutch engagement and disengagement efficiencies.

In a preferred embodiment, a fan clutch includes a housing and a cover cooperating to contain a viscous fluid. A pump plate divides an interior of the fan clutch into a working chamber and a reservoir. A driven clutch plate, disposed in the working chamber, includes hub and disk portions. A wiper is mounted on the pump plate adjacent a discharge orifice so that a first clearance is provided between the wiper and a front surface of the disk portion. An annular blocking wall is formed on the front surface of the disk portion radially inbound of the wiper. The height of the blocking wall is such that a second clearance formed between the blocking wall and the pump plate is less than or substantially equal to the first clearance, thereby forming a dynamic seal.

DETAILED DESCRIPTION OF THE PREFERRED EMBODIMENT

Figure 1:
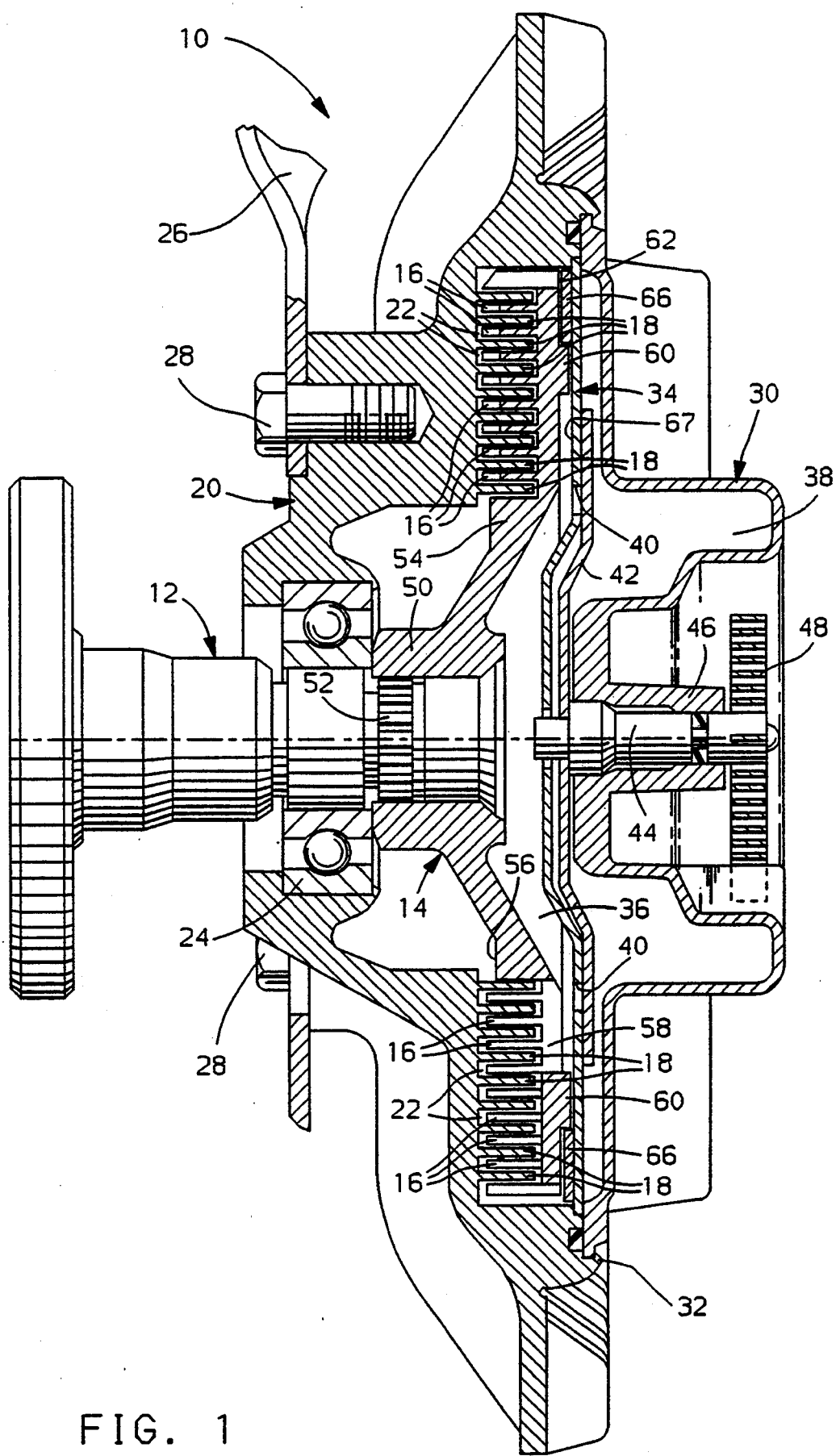
FIG. 1 is an axial sectional view of a viscous fluid fan clutch according to the present invention.

FIG. 1 illustrates a viscous fluid fan clutch 10 having an input shaft 12 drivingly connected to a clutch plate 14 which is presented in detail below. Annular lands 16 in a rear surface 56 of the clutch plate 14 are interdigitated with annular lands 18 of a housing 20 to form a fluid shear zone 22. The housing 20 is rotatably mounted on the input shaft 12 by a bearing assembly 24. A fan 26 is secured to the housing 20 by threaded fasteners 28. Fluid shear in the shear zone 22 drives the housing 20 and attached fan 26 in a well-known manner.

A cover 30 is secured to the housing 20 by an annular retainer lip 32. A pump plate 34 is trapped between the cover 30 and the housing 20 to divide an interior volume of the fan clutch 10 into a working chamber 36 to the left of the pump plate 34 and a reservoir 38 to the right of the pump plate 34, as viewed in FIG. 1. Control of fluid from the reservoir 38 through inlets 40 in the pump plate 34 is performed by a rotatable control arm 42. The control arm 42 is drivingly secured to a shaft 44 which projects through a hub 46 in the cover 30. A well-known bimetallic coil 48 is connected to and rotates the shaft 44 and control arm 42 in response to ambient air temperature. An increase in air temperature causes the coil 48 to expand, thereby rotating the shaft 44 and the control arm 42 to uncover the inlets 40 in the pump plate 34. Fluid travels from the reservoir 38 to the working chamber 36 to reach the shear zone 22, wherein the fluid transmits input torque from the clutch plate 14 to the housing 20 and attached fan 26. When the air temperature has decreased to a predetermined level, the coil 48 contracts, causing the shaft 44 and control arm 42 to rotate back to their original positions, thereby covering the inlets 40 and blocking fluid flow.

The clutch plate 14 includes a central hub portion 50 having an axial opening for receiving a splined portion 52 of the input shaft 12 and a disk portion 54 bounding the hub portion 50. As stated above, a plurality of concentric annular lands 16 and adjacent grooves are provided in the rear surface 56 of the disk portion 54. A plurality of fluid passages 58 are provided in the lands 16 to permit fluid to flow into the grooves and shear zone 22.

An annular, raised ridge or wall 60 is formed in a front surface 62 of the disk portion 54 radially outbound of the passages 58. A plurality of discharge orifices 64

Figure 2:
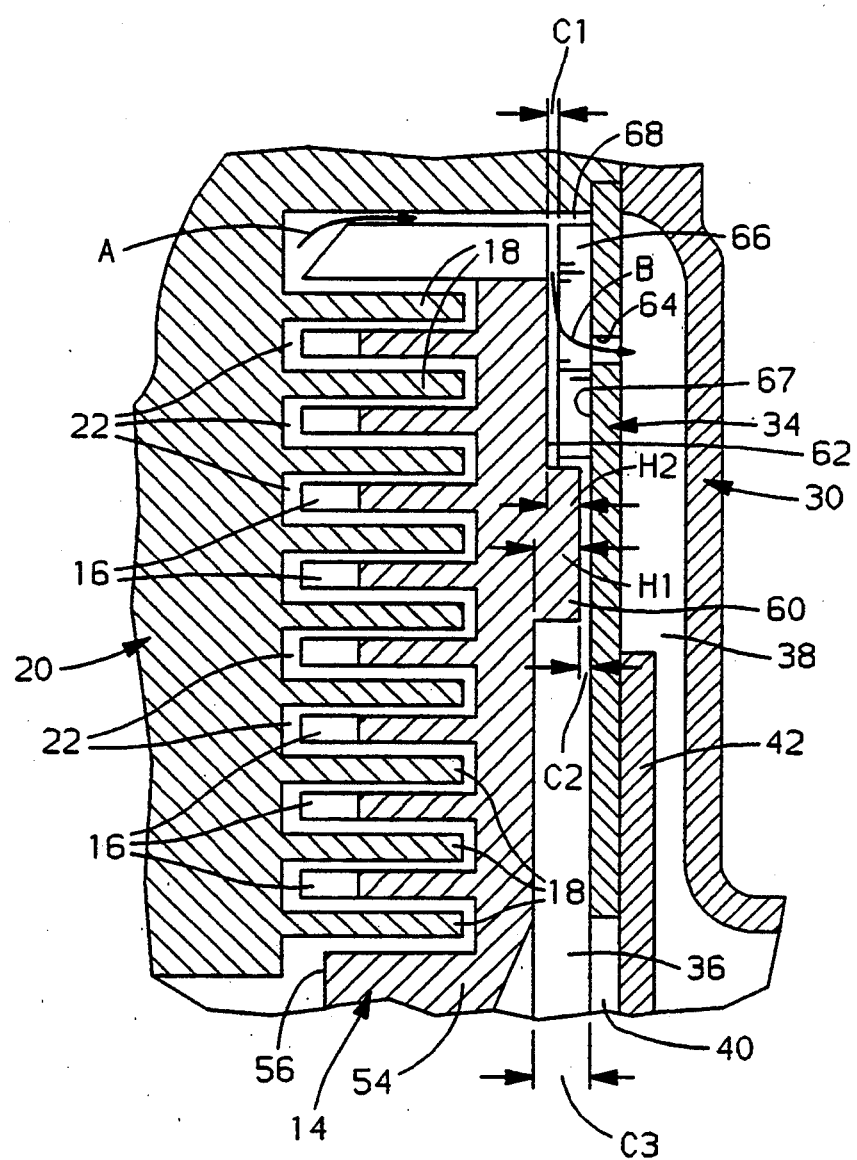
FIG. 2 is an enlarged portion of the clutch of FIG. 1 wherein the pump plate, cover and housing have been rotated to illustrate fluid returning to a reservoir through a discharge orifice in the pump plate.

(one of which is illustrated in FIG. 2) is formed through the pump plate 34. Complementary wipers 66 are mounted on the rear surface 67 of the pump plate 34 radially outbound of the wall 60. The height of the wall 60 is such that the clearance C2 between the wall 60 and the pump plate 34 is less than or substantially equal to the clearance C1 between the wiper 66 and the front surface 62 of the disk portion 54 of clutch plate 14.

Fluid indicated by directional arrow A on FIG. 2 is forced radially outwardly by centrifugal forces and exits the shear zone 22 to an annular receiving chamber 68 bounded by the pump plate 34, the front surface 62 of the disk portion 54, and the blocking wall 60. Fluid in the receiving chamber 68 is returned to the reservoir 38 through a discharge orifice 64 as indicated by directional arrow B in a well-known manner.

Clearance C2 is of such a reduced distance when compared to conventional fan clutches that a dynamic fluid seal is formed between the wall 60 and surface 67 of the pump plate 34, thereby preventing fluid in the receiving chamber 68 from traveling inboard of the blocking wall 60. Instead, a small quantity of fluid in the receiving chamber 68 that may not be pumped through the discharge orifice 64 will pass over the wiper 66. In a subsequent revolution, such fluid will collect with remaining fluid in the receiving chamber 68 and be pumped by the wiper 66 through the discharge orifice 64 to return to the reservoir 38. The prevention of fluid from traveling inboard over the blocking wall 60 increases the pump-out efficiency of the clutch 10, and thus improves the efficiency of disengagement of the clutch 10.

Preferably, a clearance C3 between the front surface 62 radially inboard of the blocking wall 60 and surface 67 of the pump plate 34 is greater than the sum of C1 and the thickness of the wiper 66. Thus, the radially inbound height H1 of the wall 60 is greater than radially outboard height H2. The dynamic seal at clearance C2 also prevents fluid entering the working chamber 36 through the inlets 40 from bypassing the passages 58, thereby improving the efficiency of clutch engagement. The blocking wall 60 and the dynamic seal eliminate the need for sealing rings used in other clutch assemblies.

Although the present invention has been described with reference to a preferred embodiment, workers skilled in the art will recognize that changes may be made in form and detail without departing from the spirit and scope the invention.

The embodiments of the invention in which an exclusive property or privilege is claimed are defined as follows:

1. A viscous fluid fan clutch comprising:
   (a) a housing;
   (b) a cover cooperating with the housing to contain a viscous fluid;
   (c) a pump plate, mounted between the housing and cover, dividing an interior of the clutch into a working chamber and a reservoir;
   (d) a driven clutch plate, disposed in the working chamber, having a hub portion and a disk portion, wherein a front surface of the disk portion is adjacent the pump plate;
   (e) at least one wiper mounted on the pump plate adjacent a discharge orifice in the pump plate so that a first clearance is provided between the wiper and the front surface of the disk portion; and
   (f) a non-sliding annular blocking wall integrally formed on the front surface of the disk portion radially inward of the wiper, the blocking wall of sufficient height so that a second clearance formed between the blocking wall and the pump plate is less than or substantially equal to the first clearance.

2. The fan clutch specified in claim 1 wherein a third clearance between a front surface of the disk portion radially inward of the blocking wall and the pump plate is greater than the sum of the first clearance and the thickness of the wiper.

3. The fan clutch specified in claim 1 wherein a plurality of concentric lands are formed on a rear surface of the disk portion of the clutch plate and interdigitated with complementary lands in the housing.

4. The fan clutch specified in claim 1 wherein a fan is attached to the housing.

5. In a viscous fluid clutch assembly including a clutch plate rotatably driven by an input shaft and a pump plate including a wiper, the clutch plate comprising:
   (a) a member having a central hub portion for receiving the input shaft and a disk portion bounding the hub;
   (b) a plurality of concentric, annular lands and grooves formed on a rear surface of the disk portion;
   (c) a plurality of passages in the lands for directing fluid in the clutch assembly to the grooves; and
   (d) a non-sliding annular blocking wall integrally formed on a front surface of the disk portion so that a radially inward axial height of the wall is greater than a radially outward axial height of the wall, wherein a first clearance between the front surface and the wiper on the pump plate is greater than a second clearance between the blocking wall and the pump plate.

* * * * *

UNITED STATES PATENT AND TRADEMARK OFFICE
CERTIFICATE OF CORRECTION

PATENT NO : 5,377,798

DATED : January 3, 1995

INVENTOR(S) : B. Drennen, et. al.

It is certified that error appears in the above-identified patent and that said Letters Patent is hereby corrected as shown below:

Title page, item [75], inventors: add --David M. Hudson --.

Signed and Sealed this

Seventh Day of March, 1995

*Attest:*

BRUCE LEHMAN

*Attesting Officer*     *Commissioner of Patents and Trademarks*